United States Patent [19]

Hall

[11] Patent Number: 4,672,097

[45] Date of Patent: Jun. 9, 1987

[54] PROCESS AND SYSTEM FOR PREPARING RANDOM COPOLYMERS HAVING LOW VINYL CONTENTS

[75] Inventor: James E. Hall, Akron, Ohio

[73] Assignee: The Firestone Tire & Rubber Company, Akron, Ohio

[21] Appl. No.: 844,044

[22] Filed: Mar. 25, 1986

[51] Int. Cl.$^4$ .............................................. C08F 4/46
[52] U.S. Cl. ..................................... 526/174; 526/173; 502/153
[58] Field of Search ............... 526/173, 174, 181, 183; 502/153, 155, 156, 157

[56] References Cited

U.S. PATENT DOCUMENTS 3,742,077  6/1973  Kamienski et al. ................. 585/438
3,822,219  7/1974  Kamienski et al. ................. 502/153
3,847,883  11/1974  Kamienski et al. ................. 526/173

OTHER PUBLICATIONS

K. Sardelis et al., Polymer, vol. 25, pp. 1011–1019 (Jul. 1984).

Primary Examiner—Paul R. Michl
Attorney, Agent, or Firm—Frank J. Troy, Sr.

[57] ABSTRACT

A process is disclosed herein for preparing randomized copolymers of conjugated dienes and vinyl aromatic hydrocarbons having low vinyl contents by utilizing an anionic initiator system comprising alkali metal trihydrocarbyl magnesiates optionally together with an organolithium compound.

14 Claims, No Drawings

PROCESS AND SYSTEM FOR PREPARING RANDOM COPOLYMERS HAVING LOW VINYL CONTENTS

SUMMARY OF THE INVENTION

A process is disclosed herein for preparing randomized copolymers of conjugated dienes and vinyl aromatic hydrocarbons having low vinyl contents by utilizing an anionic initiator system comprising alkali metal trihydrocarbyl magnesiates optionally together with an organolithium compound.

BACKGROUND OF THE INVENTION

It is known in the styrene-butadiene polymerization art that the use of a randomizing modifier together with an anionic initiator system generally increases the vinyl content of the 1,3-diene contributed units in the copolymers. The use of randomizing modifiers also presents problems in the polymerization process as the modifier or its degradation products must be recovered after polymerization has been completed.

It is an object of the present invention to provide anionic initiator systems for styrene-butadiene type copolymers which randomize the styrene type monomers in the copolymers without specifically utilizing randomizing modifiers.

It is a further object of the present invention to provide anionic initiator systems which produce styrene-butadiene type copolymers having low vinyl contents in the 1,3-diene monomer contributed units.

DESCRIPTION OF THE INVENTION

According to this invention there is provided a process for preparing randomized copolymers which comprises contacting at least two different monomeric materials with an initiator system comprised of at least one alkali metal trihydrocarbyl magnesiate compound and optionally with an organolithium compound. At least one of the two monomers is selected from the group consisting of conjugated dienes having from four to 12 carbon atoms per molecule. The other monomer is selected from the group consisting of vinyl aromatic hydrocarbons having from eight to 20 carbon atoms per molecule.

The instant invention utilizes no modifiers to achieve randomization. Randomization is achieved solely through the use of an anionic initiator system. Through the sole utilization of the anionic initiator system of the present invention randomized copolymers are produced which contain vinyl contents in the 1,3-diene contributed units which were lower than 35%.

The anionic initiator system which is utilized in the instant invention to produce randomized copolymers having reduced vinyl contents consists of at least one alkali metal trihydrocarbyl magnesiate compound and optionally an additional amount of an organolithium compound.

The alkali metal trihydrocarbyl magnesiates are either sodium or potassium trihydrocarbyl magnesiate compounds which are represented by the structural formula:

wherein M is Na or K, and $R_1$, $R_2$ and $R_3$ are independently selected from the group consisting of a $C_2$–$C_{14}$ hydrocarbon organo radical or a heterocyclic radical. These $C_2$–$C_{14}$ organo radicals may be alkyl, aryl, cycloalkyl, cycloalkenyl-alkyl, aryl-alkyl, aryl-cycloalkyl, cycloalkylaryl, or ethylenically unsaturated organo radicals such as vinyl, allyl and propenyl. Heterocyclic radicals which may be employed include 2-pyridyl and 2-thienyl.

The preferred organo radicals $R_1$, $R_2$ and $R_3$ which can be employed in the present invention are n-hexyl, n-butyl, s-butyl, and 2-ethylhexyl.

The preferred $MR_1R_2R_3Mg$ compounds for use in the present invention include sodium tri-n-hexyl magnesiate, sodium tributyl magnesiate, sodium dibutylhexyl magnesiate, and sodium dibutyl 2-ethylhexyl magnesiate. Mixtures of different sodium or potassium trihydrocarbyl magnesiates can be employed in the instant anionic initiation system.

Any organolithium catalyst which are known in the art as being useful in the polymerization of vinyl aromatic hydrocarbons and conjugated dienes can be employed in the present invention. Suitable catalysts which initiate polymerization of the monomer system include organolithium catalysts which have the formula $R(Li)_x$ wherein R represents a hydrocarbyl radical of 1 to 20, preferably 2–8, carbon atoms per R group, and x is an integer of 1–4. Typical R groups include aliphatic radicals and cycloaliphatic radicals, such as alkyl, cycloalkyl, cycloalkylalkyl, alkylcycloalkyl, aryl and alkylaryl radicals.

Specific examples of R groups for substitution in the above formula include primary, secondary and tertiary groups such as methyl, ethyl, n-propyl, isopropyl, n-butyl, isobutyl, t-butyl, n-amyl, isoamyl, n-hexyl, n-octyl, n-decyl, cyclopentyl-methyl, cyclohexyl-ethyl, cyclopentyl-ethyl, methyl-cyclopentylethyl, cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, and the like.

Specific examples of other suitable lithium catalysts include: phenyllithium, naphthyllithium, 4-butylphenyllithium, p-tolyllithium, 4-phenylbutyllithium; 4-butylcyclohexyllithium, 4-cyclohexylbutyllithium, 1,4-dilithiobutane, 1,10-dilithio-decane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane,1,5,10,20-tetralithioeicosane, 1,2,4,6-tetralithiocyclohexane, 4,4'-dilithiobiphenyl, and the like.

Mixtures of different lithium catalysts can also be employed, preferably containing one or more lithium compounds such as $R(Li)_x$. The preferred lithium catalyst for use in the present invention is n-butyllithium.

Other lithium catalysts which can be employed are lithium dialkyl amines, lithium dialkyl phosphines, lithium alkyl aryl phosphines and lithium diaryl phosphines.

The molar ratio of the organolithium compound to the alkali metal trihydrocarbyl magnesiate compound in the instant anionic initiator system can vary from 0.0/1.0 to 10/1.0, preferably from 0.0/1.0 to 3.0/1.0.

In the following discussion the millimoles of anionic initiator is based upon the total lithium and alkali metal content in the organolithium and $MR_1R_2R_3Mg$ initiator compounds present in each catalyst system.

The millimole ratio of the anionic initiator mixture to the weight of the monomers which is employed in the preparation of the copolymers of the present invention is based upon the number of millimoles of the anionic initiator per hundred grams of monomer. The ratio of millimoles of anionic initiator per hundred grams of monomer for use in the present invention ranges between 0.2 millimoles to 100 millimoles, preferably 0.3 millimoles to 3.0 millimoles of anionic initiator per hundred grams of monomer.

The ratio of the components of the anionic initiator mixture employed in producing the copolymers of the present invention is a factor in the content of 1,2-microstructure in the 1,3-diene copolymer finally produced. It has been determined that the 1,3-diene copolymers produced according to the process of this invention should have a vinyl content ranging between about 10 to 35 percent 1,2-microstructure.

All amounts of anionic initiators are indicated by millimoles per hundred grams of monomer or by ratio of components in the instant invention and are considered to be catalytically effective amounts, that is, effective amounts for initiating and conducting polymerization of the disclosed monomer systems to produce a copolymer containing a 1,2-microstructure ranging between about 10 and 35 percent in the 1,3-diene monomer contributed units.

Process conditions such as the initial and maximum temperature of the polymerization reaction can independently affect the final 1,2-microstructure content of the 1,3-diene copolymers. These conditions can be controlled for each monomer reaction system to produce the final desired 1,2-microstructure content of from about ten (10) to thirty five (35) percent. It is desirable to produce polymers and copolymers having a 1,2-microstructure between 10 and 20 percent in the 1,3-diene monomer contributed units.

The term 1,2-microstructure as used in the present invention actually refers to the mode of addition of a growing polymer chain with a conjugated diene monomer unit. Either 1,2-addition or 1,4-addition can occur. In terms of nomenclature this results in 1,2-microstructure for the monomer unit in the polymer chain when 1,3-butadiene is the monomer. When isoprene is the monomer, 3,4-microstructure most generally results with a smaller amount of 1,2-microstructure in the polymer chain. Naming of the polymer structure which results from 1,2-addition is thus dependent on the monomer being polymerized. For simplicity, the terms vinyl content or 1,2-microstructure are employed to describe the microstructure which results from 1,2-addition of conjugated dienes.

As previously discussed at least one of the two monomers which is to be randomized in the present invention is selected from the group consisting of one or more conjugated dienes having from four to 12 carbon atoms per molecule. Examples thereof include the following: 1,3-butadiene; isoprene; 2,3-dimethyl-1,3-butadiene; 1,3-pentadiene (piperylene);2-methyl-3-ethyl-1,3-butadiene; 3-methyl-1,3-pentadiene; 1,3-hexadiene; 2-methyl-1,3-hexadiene; 3-butyl-1,3-octadiene, and the like. Among the dialkylbutadienes, it is preferred that the alkyl groups contain from one to three carbon atoms. Numerous others are disclosed, for instance in U.S. Pat. No. 3,377,404, the disclosure with respect to which is incorporated herein by reference. The preferred 1,3-diene monomer for use in the present invention is butadiene.

In addition to the above described conjugated dienes, one or more suitable copolymerizable monomers such as vinyl-substituted aromatic monomers are incorporated into the polymerization mixture. Examples of suitable copolymerizable monomers for use in the preparation of copolymers in the present invention include: styrene; alpha-methylstyrene; 1-vinylnaphthalene; 2-vinylnaphthalene; 1-alpha-methylvinyl-naphthalene; 2-alpha-methylvinylnaphthalene; 1,2-diphenyl-4-methylhexene-1; 1,6-diphenyl-hexadiene-1,5; 1,3-divinylbenzene; 1,3,5-trivinylbenzene; 1,3,5-triisopropenyl-benzene; 1,4-divinylbenzene; 1,3-distyrylbenzene; 1,4-distyrylbenzene; 1,2-distyrylbenzene; and mixtures of these as well as alkyl, cycloalkyl, aryl alkaryl and aralkyl derivatives thereof in which the total number of carbon atoms in the combined hydrocarbon constitutes generally not greater than 12. Examples of these latter compounds include: 4-methylstyrene; vinyl toluene; 3,5-diethylstyrene; 2-ethyl-4-benzylstyrene; 4-phenylstyrene; 4-p-tolylstyrene; 2,4-divinyltoluene; 4,5-dimethyl-1-vinylnaphthalene; 2,4,6-trivinyltoluene; and 2,4,6-triisopropenyl-toluene. Again reference is made to U.S. Pat. No. 3,377,404 for disclosures of additional vinyl-substituted aromatic compounds which are incorporated herein by reference.

In the process of the present invention the randomization of the conjugated dienes and vinyl-substituted aromatic monomers is effective in monomer ratios ranging from 2-98% vinyl-substituted aromatic hydrocarbons to 2-98% conjugated diene. The randomization process is especially effective when the monomer ratio is from 20-90% vinyl-substituted aromatic hydrocarbon to 80-10% conjugated diene. All percentages are herein designated as being by weight.

The use of the anionic initiator system of the present invention randomizes the vinyl-substituted aromatic hydrocarbon contributed units in the above-identified copolymer systems. While the following discussion relating to randomizing copolymer specifically discusses the use of styrene and 1,3-butadiene it is apparent that this discussion encompasses the use of any of the above-identified vinyl-substituted aromatic hydrocarbons and conjugated dienes.

It has been determined that styrene-butadiene copolymers which contain up to 40 percent styrene content of the total monomers by weight and which are polymerized in the sole presence of an organolithium compound contain up to 70 percent of block styrene of the total styrene content as determined by $^1H$ NMR. The use of the anionic initiation systems of the present invention produce copolymers having less than 40 percent block styrene preferably less than 25 percent block styrene of the total styrene content in styrene-butadiene copolymers having up to 40 percent of styrene content.

In copolymers of styrene-butadiene having a styrene content greater than 40 percent of the total monomers it has been determined that the anionic initiation system of the present invention significantly increases randomization.

The copolymerization of 1,3-diene monomer and the vinyl substituted aromatic monomer in the aforementioned system is preferably effected adiabatically with an increase in temperature occurring during the course of the reaction. As used in the connection the term adiabatic polymerization means that heat is neither supplied or removed during the course of polymerization.

The present polymerization system is applicable to solution polymerization techniques which are conducted at temperatures of 80° C. to 180° C. preferably 100° C. to 160° C. Any temperature in this range of 80°

C. to 180° C. which gives a convenient polymerization rate while producing a copolymer having a 1,2-microstructure ranging between 10 and 35 percent is acceptable. If the operation is to be conducted as a batch operation, initiation temperatures of approximately 80° C. are preferred. If the operation is to be a continuous operation higher initiation temperatures can be employed, such as 100° C. to 120° C. and it is preferred that the polymerization process be maintained in a range of from 100° C. to 160° C. most preferably 115° C. to 140° C.

The polymerization reaction can be performed at pressures between 0.5 and 100 atmospheres. When the desired degree of polymerization has been reached, the copolymer can be isolated by precipitation with a non-solvent such as methanol, isopropanol or water and an appropriate antioxidant can be added at this stage of polymerization. Alternatively, the solution can be injected into the slurry tank containing a hot non-solvent whereupon the solvent is flashed off and the copolymer remains as a slurry with non-solvent. Alternatively, the solvent can be removed directly by the application of heat and/or flashing to a lower pressure.

The number average molecular weight of the final copolymer produced can range from 1,000 to 500,000. These copolymers depending on their molecular weight and composition can be used for a variety of goods such as tires, and various adhesive applications. These copolymers can be utilized as impact modifiers for polymer systems such as polystyrene.

It is believed that one skilled in the art can, using the preceding description, utilize the present invention to its fullest extent. The following preferred specific embodiments are, therefore, to be construed as merely illustrative of the catalyst system and the polymerization process of the present invention.

The polymerization reactions in the following examples were performed individually in a one gallon stainless steel reactor equipped with a stirrer blade and pressurized. Dry, pure monomer or monomers in hexane were charged in appropriate amounts. In all examples in Table 1 the $MR_1R_2R_3Mg$ compound utilized was sodium tri-n-hexyl magnesiate. Sodium dibutyl 2-ethylhexyl magnesiate was used in examples in Table 2. In all examples the RLi compound was n-butyllithium. These anionic initiators were charged into the reactor after the monomer solutions had been heated to the desired initiation temperature.

In examples 1-15 the weight percent of styrene monomer which was utilized in each example is approximated by the percent of bound styrene as conversion of monomer to polymer generally exceeded 93%. The remaining percent of monomer utilized in each example is 1,3-butadiene monomer.

EXAMPLES 1-13

The following batch polymerization reactions displayed in Table 1 utilized styrene and 1,3-butadiene monomers in hexane in varying ratios. The percentage of styrene used is approximately equal to the percent bound styrene found. Total monomer concentration in hexane varied from 7.7 to 17.0 percent and the polymerization reactions were conducted at the indicated temperature ranges. Each anionic initiator was added in the ratios indicated with the total initiator level used being approximately 1 millimole per 100 grams of total monomer. After polymerization was completed the resultant polymer was tested for vinyl (1,2-microstructure) content and bound styrene and block styrene. Block styrene is percent block based on 100 percent styrene. Block styrene content was determined by $^1H$ nmr analysis as discussed in *Rubber Chemistry and Technology*, Vol. 43, No. 5, pp. 1138–1152 (September, 1970). In Examples 6-8 there is disclosed for each example the calculated random block styrene which represents the amount of block styrene which would be present in a totally random styrene-1,3-butadiene copolymer for the percentage of bound styrene indicated.

TABLE 1

| Example | $NaR_1R_2R_3Mg/RLi$ | Temp. °C. | % Vinyl Content | % Bound Styrene | % Block Styrene | Calc. Random Block Styrene |
|---|---|---|---|---|---|---|
| 1 | 0/1 | 98–125 | 11.0 | 40.7 | 66.1 | |
| 2 | 1/0 | 98–99 | 30.0 | 41.2 | 6.7 | |
| 3 | 1/1 | 93–104 | 17.7 | 45.1 | 12.1 | |
| 4 | 1/1 | 100–108 | 12.3 | 66.7 | 24.7 | |
| 5 | 1/1 | 120–144 | 15.8 | 33.6 | 21.1 | |
| 6 | 1/1 | 99–104 | 11.6 | 71.7 | 54.7 | 30 |
| 7 | 1/1 | 99–104 | 10.6 | 79.4 | 48.7 | 47 |
| 8 | 1/1 | 98–104 | 14.4 | 84.9 | 57.5 | 63 |
| 9 | 2/1 | 99–103 | 15.6 | 29.5 | 26.4 | — |
| 10 | 1.9/1 | 107–130 | 18.3 | 32.7 | 14.7 | — |
| 11 | 1/1 | 99–120 | 22.8 | 32.1 | 2.6 | — |
| 12 | 1/1 | 98–130 | 15.9 | 39.2 | 28.2 | — |
| 13 | 2/3 | 98–120 | 16.8 | 41.7 | 20.7 | — |

EXAMPLES 14-17

The following continuous polymerization reactions displayed in Table 2 utilized a 8 gal. stainless steel reactor for the polymerization with average residence time in the reactor of 30–45 minutes. Monomers, hexane and initiators were charged in the bottom of the reactor and product in solution removed at the top. The temperature range is the variation in temperature from the bottom of the reactor to the top. Total monomer concentration varied from 17 to 23 percent. Conversion to polymer varied from 91 to 100 percent.

TABLE 2

| Example | $NaR_1R_2R_3Mg/RLi$ | Temp. °C. | % Vinyl Content | % Bound Styrene | % Block Styrene |
|---|---|---|---|---|---|
| 14 | 0/1 | 90–120 | 14.6 | 36.3 | 45.7 |
| 15 | 0.5/1 | 90–116 | 15.0 | 37.4 | 32.7 |
| 16 | 1.0/1 | 149–151 | 17.5 | 33.9 | 23.0 |
| 17 | 1.0/1 | 149–150 | 19.8 | 31.4 | 20.6 |

I claim:

1. A process for preparing random copolymers of conjugated diene and vinyl substituted aromatic hydrocarbon containing a 1,2-microstructure ranging between 10% and 20%, said process comprising contacting at least one monomer of a conjugated diene having 4 to 12 carbon atoms per molecule and at least one monomer of a vinyl-substituted aromatic hydrocarbon having from eight to 20 carbon atoms per molecule with an anionic initiation system at a polymerization temperature ranging from 80° C. to 180° C. to cause formation of said copolymers and recovering the copolymers, said initiation system comprising
   (a) $MR_1R_2R_3Mg$ wherein M is Na or K and $R_1$, $R_2$ and $R_3$ are independently selected from the group consisting of hydrocarbyl radicals of 2 to 14 carbon atoms, 2-pyridyl and 2-thienyl; and
   (b) an organolithium compound having the formula $R(Li)_x$ wherein R represents a hydrocarbyl radical of 1 to 20 carbon atoms selected from the group consisting of alkyl, cycloalkyl, cycloalkylalkyl, alkylcycloalkyl, aryl and alkylaryl radicals and x is an integer of 1–4, lithium dialkyl amines, lithium dialkyl phosphines, lithium alkyl aryl phosphines and lithium diaryl phosphines,
   wherein (a) and (b) are present in a molar ratio of (a) to (b) of 0.1/1 to 2:1 and in an amount ranging from about 0.3 millimoles per 100 grams of monomer to about 3 millimoles per 100 grams of monomer so as to promote formation of said copolymers.

2. The process as in claim 1 wherein the polymerization temperature ranges from about 100° C. to about 160° C. the molar ratio of (a) to (b) ranges from 0.1/1 to 1/1.

3. The process as in claim 1 wherein the molar ratio of (a) to (b) ranges from 0.5/1 to 2/1.

4. The process as in claim 1 wherein the conjugated diene is 1,3-butadiene.

5. The process as in claim 1 wherein the vinyl-substituted aromatic hydrocarbon is styrene.

6. The process as in claim 1 wherein (a), the $MR_1R_2R_3Mg$, is selected from the group consisting of sodium tri-n-hexyl magnesiate, sodium tributyl magnesiate, sodium dibutyl hexyl magnesiate and sodium dibutyl 2-ethylhexyl magnesiate.

7. The process as in claim 1 wherein (b), the organolithium compound, is n-butyllithium.

8. The process as in claim 1 wherein the copolymers are formed from a monomer system containing 2 to 98 percent vinyl-substituted aromatic hydrocarbon and 98 to 2 percent conjugated diene.

9. The process as in claim 1 wherein $R(Li)_x$ is selected from the group consisting of phenyllithium, naphthyllithium, 4-butylphenyllithium, p-tolyllithium, 4-phenylbutyllithium, 4-butylcyclohexyllithium, 4-cyclohexylbutyl, 1,4-dilithiobutane, 1,10-dilithiodecane, 1,20-dilithioeicosane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5,-trilithiocyclohexane,1,3,4,8-tetralithiodecane, 1,5,10,20-tetralithioeicosane, 1,2,4,6-tetralithiocyclohexane,4,4'-dilithiobiphenyl.

10. The process as in claim 1 wherein the copolymers are formed from a monomer system containing 20 to 90 percent vinyl-substituted aromatic hydrocarbon and 80 to 10 percent conjugated diene.

11. The process of claim 1 wherein the conjugated diene is 1,3-butadiene, the vinyl-substituted aromatic hydrocarbon is styrene, and the anionic initiator system comprises (a) sodium trihydrocarbyl magnesiate selected from the group consisting of sodium-tri-n-hexyl magnesiate and sodium dibutyl 2-ethylhexyl magnesiate and (b) n-butyllithium.

12. The process of claim 11 wherein the molar ratio of (a) to (b) is 1/1 and (a) and (b) are present in an amount of 1 millimole per 100 grams of monomer.

13. The process of claim 1 wherein the process is carried out continuously, the molar ratio of (a) to (b) ranges from 0.1/1 to 0.5/1 and the polymerization temperature ranges from about 115° C. to 140° C.

14. The process of claim 1 carried out on a continuous basis.

* * * * *